United States Patent
Kishi et al.

(10) Patent No.: US 8,983,219 B2
(45) Date of Patent: Mar. 17, 2015

(54) IMAGE PROCESSING APPARATUS AND CONTROL METHOD THEREFOR

(75) Inventors: Hiroki Kishi, Funabashi (JP); Yuki Shiraishi, Tokyo (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/362,625

(22) Filed: Jan. 31, 2012

(65) Prior Publication Data

US 2012/0219234 A1    Aug. 30, 2012

(30) Foreign Application Priority Data

Feb. 25, 2011    (JP) ................................. 2011-040838

(51) Int. Cl.
*G06K 9/36* (2006.01)
*G06K 9/46* (2006.01)
*H04N 19/40* (2014.01)
*H04N 19/132* (2014.01)
*H04N 19/146* (2014.01)
*H04N 19/18* (2014.01)
*H04N 19/635* (2014.01)

(52) U.S. Cl.
CPC ............ *H04N 19/40* (2014.11); *H04N 19/132* (2014.11); *H04N 19/146* (2014.11); *H04N 19/18* (2014.11); *H04N 19/635* (2014.11)
USPC ........................................................ 382/244

(58) Field of Classification Search
CPC .................. H04N 19/00078; H04N 19/00503; H03M 7/30; H03M 7/40; H03M 7/46
See application file for complete search history.

(56) References Cited

U.S. PATENT DOCUMENTS 6,408,102 B1 * 6/2002 Nakayama .................... 382/246
7,110,608 B2 * 9/2006 Chan et al. .................... 382/239
7,245,769 B2 * 7/2007 Temizel et al. ............... 382/233
7,315,651 B2 * 1/2008 Sakuyama et al. ............ 382/232

(Continued)

FOREIGN PATENT DOCUMENTS

JP    2007-166492    6/2007

OTHER PUBLICATIONS

Kenji Matsuom Masayuki Hashimoto, and Atsushi Joike; A JPEG2000 Re-Encoding Scheme With High Quality Performance for JPEG Coded Pictures; Dec. 14-17, 2003; Signal Processing and Information Technology, 2003. ISSPIT 2003. Proceedings of the 3rd IEEE International Symposium Conference Publications; pp. 660-663.*

*Primary Examiner* — Vu Le
*Assistant Examiner* — Guillermo Rivera-Martinez
(74) *Attorney, Agent, or Firm* — Fitzpatrick, Cella, Harper & Scinto

(57) ABSTRACT

An image processing apparatus which re-encodes encoded data, encoded with a pixel block having a predetermined number of pixels as a coding unit, while suppressing degradation of image quality, with a higher compressibility. For this purpose, when an encoded-image-data input unit inputs JPEG encoded data with an 8×8 pixel block as a coding unit, a redundancy estimation unit performs encoding on the encoded data, and sets an encoded data amount obtained by the coding, as a target code amount for a recompressor to perform coding in accordance with JPEG 2000 coding. The inputted encoded data is decompressed by a decompressor, and the recompressor generates encoded data in the previously-determined target code amount. The code amount control is performed by deleting the encoded data in bit planes in an order from a least significant bit plane toward a high-order bit plane.

7 Claims, 23 Drawing Sheets

(56) References Cited

U.S. PATENT DOCUMENTS

| | | | |
|---|---|---|---|
| 7,526,134 B2* | 4/2009 | Matsubara | 382/232 |
| 7,573,405 B2* | 8/2009 | Shima | 341/51 |
| 8,559,735 B2* | 10/2013 | Sakuyama | 382/233 |
| 2003/0001964 A1* | 1/2003 | Masukura et al. | 348/441 |
| 2003/0044077 A1* | 3/2003 | Okada | 382/239 |
| 2003/0169934 A1* | 9/2003 | Naito | 382/239 |
| 2003/0174896 A1* | 9/2003 | Ridge | 382/239 |
| 2003/0228063 A1* | 12/2003 | Nakayama et al. | 382/251 |
| 2004/0131260 A1* | 7/2004 | Mekuria | 382/232 |
| 2004/0164883 A1* | 8/2004 | Horie | 341/51 |
| 2005/0053287 A1* | 3/2005 | So et al. | 382/232 |
| 2008/0037882 A1* | 2/2008 | Tamura et al. | 382/232 |

* cited by examiner

JPEG ENCODED DATA ON SOLID REGION

JPEG ENCODED DATA ON 8X8 PIXEL/CYCLE DOT REGION

FIG. 9

| NUMBER OF COEFFICIENTS / NUMBER OF DIVISIONS | 1 | 2 | 3 | ... | k |
|---|---|---|---|---|---|
| 1 | 3/5 | 5/7 | 7/9 | ... | 2k+1/2k+3 |
| 2 | 9/13 | 13/17 | 17/21 | ... | 4k+5/4k+9 |
| 3 | 21/29 | 29/37 | 37/45 | ... | 8k+13/8k+21 |
| ... | ... | ... | ... | ... | ... |
| l | ... | ... | ... | ... | $2lk+2l^2-2l+1 / 2lk+3(2l+1)$ |

N/M [ N: NUMBER OF PIXELS REQUIRED UPON GENERATION OF LOW FREQUENCY COMPONENT
M: NUMBER OF PIXELS REQUIRED UPON GENERATION OF HIGH FREQUENCY COMPONENT ]

PROCESSING SUBJECT DATA STREAM

DICTIONARY MEMORY

FIG. 13A

8X8 PIXEL BLOCK ENCODED BY 8 BITS 11011011 11011011 11011011 ⋯

8X8 PIXEL BLOCK ENCODED BY 5 BITS 11011 11011 11011 11011 11011 11011 11011 11011 11011 11011 ⋯

DE　　F7　　BD　　EF　　7B　　DE　　⋯

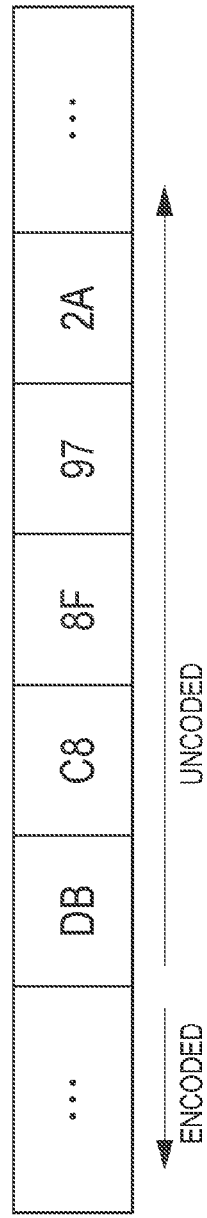
FIG. 15A
FIG. 15B
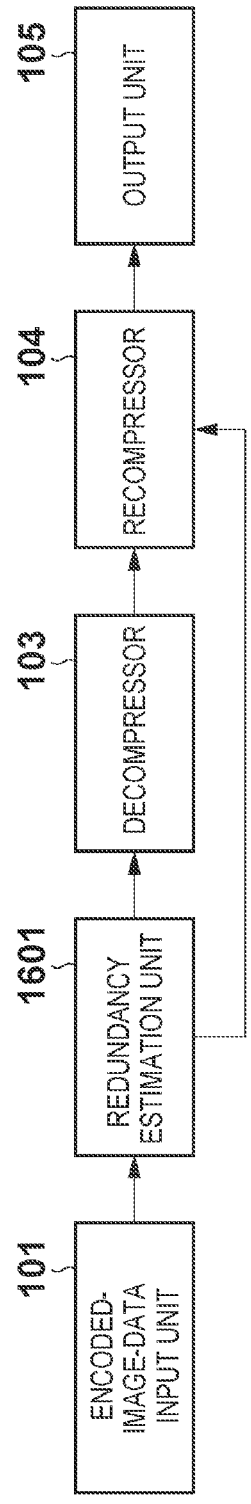
FIG. 16

F I G. 19A

| CYCLE NUMBER | 1 CYCLE CODE AMOUNT (byte) | NUMBER OF REPETITIONS | REDUNDANT CODE AMOUNT (byte) |
|---|---|---|---|
| 1 | 5 | 2 | 5 |
| 2 | 13 | 4 | 39 |
| 3 | 18 | 4 | 54 |
| ... | ... | ... | ... |
| ... | ... | ... | ... |

F I G. 19B

| CYCLE NUMBER | 1 CYCLE CODE AMOUNT (byte) | NUMBER OF REPETITIONS | REDUNDANT CODE AMOUNT (byte) |
|---|---|---|---|
| 1 | 5 | 2 | 5 |
| 2 | 13 | 4 | 39 |
| 3 | 18 | 4 | 54 |
| ... | ... | ... | ... |
| ... | ... | ... | ... |

REGARD THIS TOTAL SUM AS REDUNDANT CODE AMOUNT IN IMAGE OF INTEREST

F I G. 20C

| GROUP NO. | PATTERN NO. | PATTERN CODE AMOUNT (byte) | AFFILIATE BLOCK SERIAL NO. |
|---|---|---|---|
| 1 | (1) | 35 | 0,1,2,3,4,5,6,...,19,20,... |
| 2 | (2) | 48 | 57,58,59 |
| 3 | (4) | 25 | 62,63,64,... |
| ... | ... | | |
| ... | ... | | |

| 0 | 1 | 2 | 3 | 4 | ... |
|---|---|---|---|---|---|
| 19 | 20 | 21 | 22 | 23 | ... |
| 38 | 39 | 40 | 41 | 42 | ... |
| ... | ... | ... | ... | ... | |

8X8 PIXEL SERIAL NO.

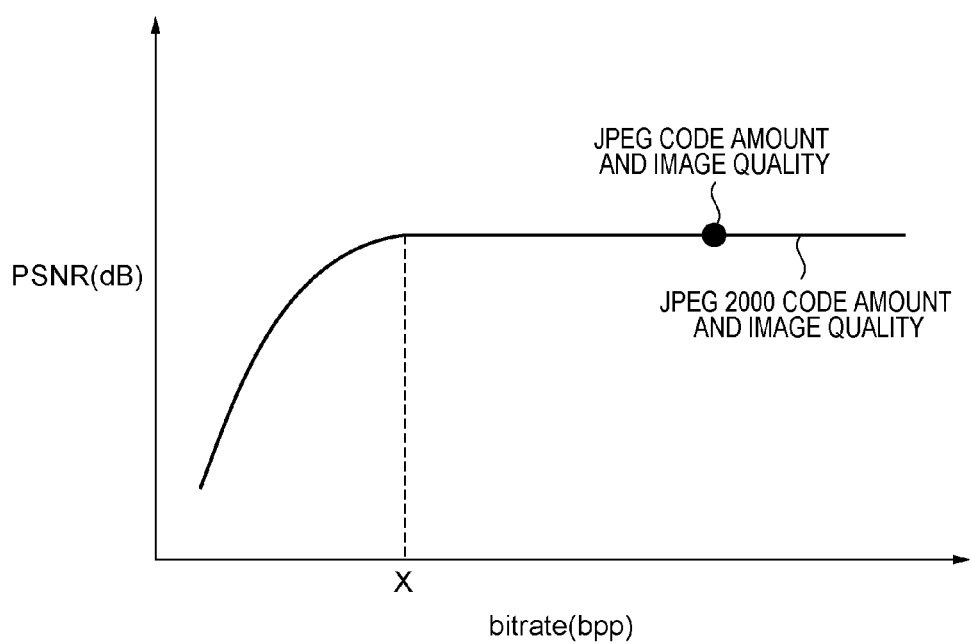
F I G. 21

IMAGE PROCESSING APPARATUS AND CONTROL METHOD THEREFOR

BACKGROUND OF THE INVENTION

1. Field of the Invention

The present invention relates to an image data coding technique.

2. Description of the Related Art

In image transmission, an image compression rate control function of flexibly changing image data amount draws attention. This function enables change of code amount of compressed image data (encoded image data) without decoding and facilitates change of data amount in accordance with bandwidth of network to transmit the encoded image data. As an image compression method having this function, JPEG 2000 and the like are known.

Since JEPG (also referred to herein as "JPEG" or "JPG") encoded data or the like has no rate control function, in some cases, the data is decoded once, then converted to encoded data having the rate control function such as JEPG 2000 data, thereby re-encoding is valid. For example, as a technique for setting a code amount and performing re-encoding, Japanese Patent Laid-Open No. 2007-166492 is known.

For example, in a comparison between JPEG coding to perform coding in 8×8 pixel units and JPEG 2000 coding to perform coding using a wider range as a unit, JPEG 2000 has a higher capability or probability of elimination of image information redundancy with a wider range.

SUMMARY OF THE INVENTION

The present invention has been made in view of the above situation. The present invention provides a technique for re-encoding encoded data, encoded by pixel block having a predetermined number of pixels as a unit, while suppressing degradation of image quality, with further high compressibility.

To solve the above problem, according to an aspect of the invention, there is provided an image processing apparatus which re-encodes encoded data, encoded in accordance with a first coding algorithm, with a pixel block having a predetermined number of pixels as a unit, comprising: an input unit to input encoded data as a re-encoding subject; a second encoder, based on a second coding algorithm, to perform coding with a block in a larger size than the pixel block as a unit; a target code amount calculation unit to calculate a target code amount with respect to the second encoder, from a code amount obtained by encoding the encoded data inputted by the input unit in accordance with a third coding algorithm; and a controller to decode the encoded data inputted by the input unit, control the second encoder, to generate encoded data in the target code amount.

According to the present invention, it is possible to re-encode encoded data, encoded by pixel block having a predetermined number of pixels as a coding unit, while suppressing degradation of image quality, with further high compressibility.

Further features of the present invention will become apparent from the following description of exemplary embodiments (with reference to the attached drawings).

BRIEF DESCRIPTION OF THE DRAWINGS

FIG. 9 is a table showing the numbers of pixels required in the Discrete Wavelet transformation;

FIGS. 13A and 13B are explanatory diagrams of redundancy which occurs in dictionary-based encoded data;

FIGS. 15A and 15B are examples of the processing subject data stream and the dictionary memory in the progress of the dictionary-based coding;

FIG. 16 is a block diagram of the image processing unit in a second embodiment of the present invention;

FIGS. 19A and 19B are explanatory diagrams of continuous cycle information in the second embodiment;

FIGS. 20A to 20C are explanatory diagrams of a method for redundancy measurement from a decompressed image in another embodiment of the present invention;

FIG. 21 is an explanatory diagram of a problem which occurs upon recompression;

DESCRIPTION OF THE EMBODIMENTS

Preferred embodiments of the present invention will now be described in detail in accordance with the accompanying drawings.

The embodiments relate to problem and solution upon recompression. In the embodiments, the subject of re-encoding is JPEG-encoded image data (JPEG encoded data), and recompression processing is performed on the data in accordance with the JPEG 2000 method.

Figure 22:
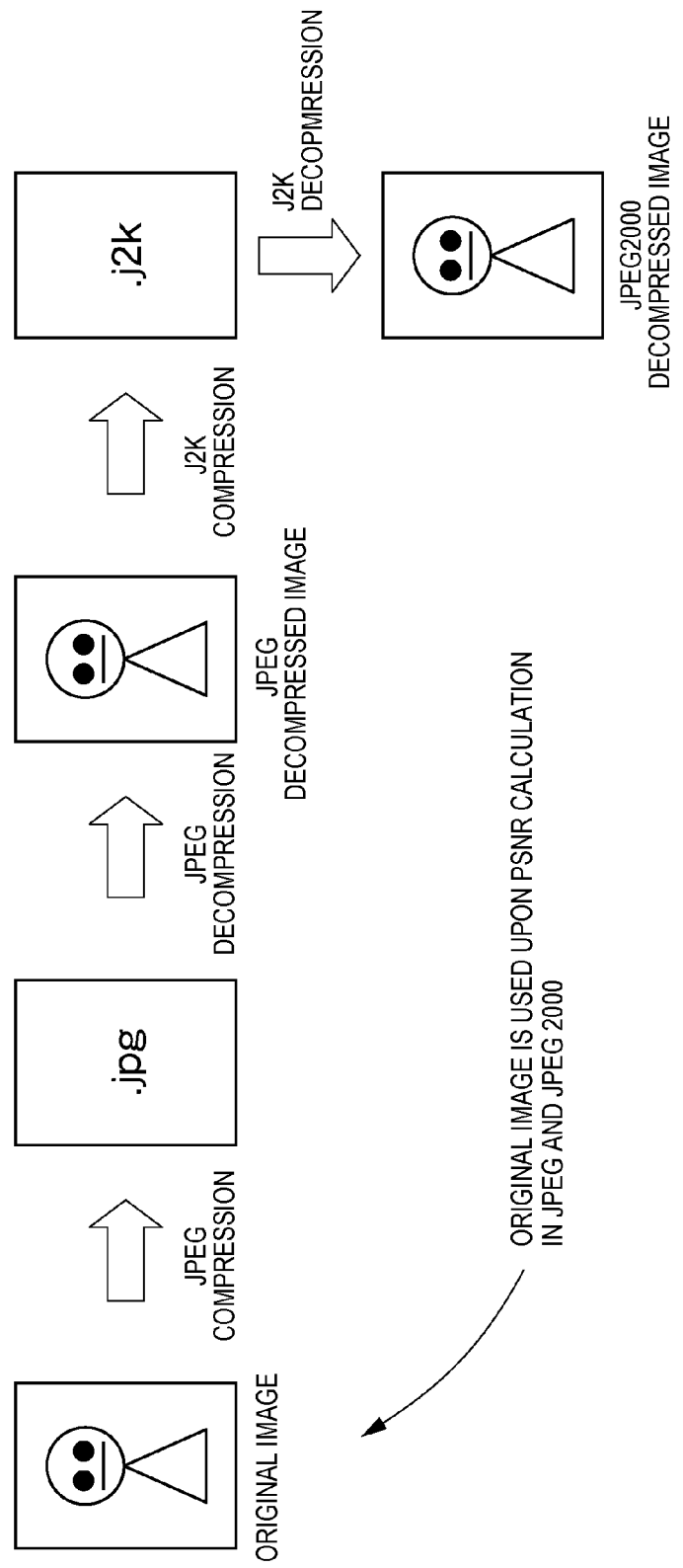
FIG. 22 is an explanatory diagram of an image used in PSNR calculation.

FIG. 21 is a graph tracing the result of JPEG coding with some quantization parameter with respect to an input image (1 point) and the result of recompression test with several parameters related to JPEG 2000 compressibility with respect to a decoded image from the JPEG encoded data. Note that FIG. 22 shows the outline of the recompression processing. Upon PSNR measurement in JPEG 2000, as the image quality viewed from, not a JPEG decompressed image but an original image is significant, the original image subjected to the JPEG compression is used. As shown in FIG. 21, the image quality is not improved in accordance with increment of the code amount from a bit rate X (bpp). Since the subject of coding is the JPEG decompressed image, it is impossible to obtain image quality equal to or higher than that of the image. In other words, when JPEG 2000 coding is performed at the bit rate X, coding with higher compressibility can be performed without degradation of image quality. However, the bit rate X (bpp) cannot be accurately obtained. An image obtained from an input device or an image generated with editing software on a PC or the like can be compressed, however, in many cases, the original image of such image does not remain. For example, in a digital camera, an image obtained by image sensing is often compressed and stored, however, an image corresponding to an original image is not always stored. Accordingly, it is often impossible to obtain the least code amount to maintain the image quality of the decompressed image.

Figure 23:
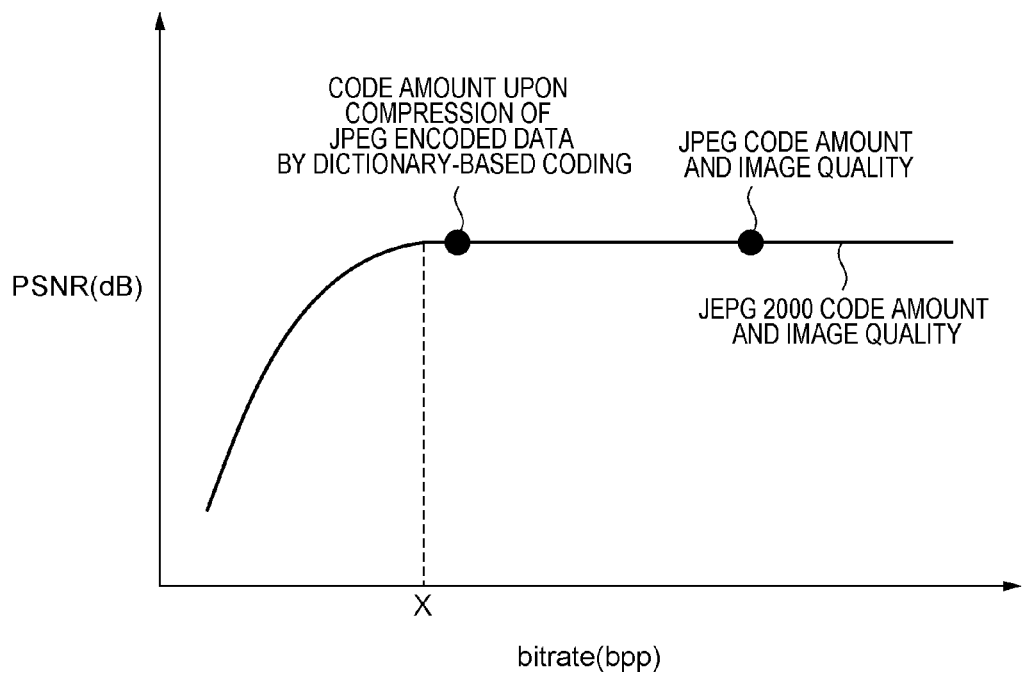
FIG. 23 is an explanatory diagram of code amount upon compression of JPEG encoded data by the dictionary-based coding.

In the present embodiment, as shown in FIG. 23, JPEG encoded data is subjected to lossless compression by dictionary-based coding. Then, as a result, the obtained code amount is used as a target code amount (target bit rate X) upon recompression.

First, the ground for reduction of code amount by JPEG coding without degradation of image quality by use of the JPEG 2000 method will be described. Then, the adequacy of application of the dictionary-based coding to JPEG encoded data and setting of generated code amount as a target code amount upon recompression will be described.

Figure 3:
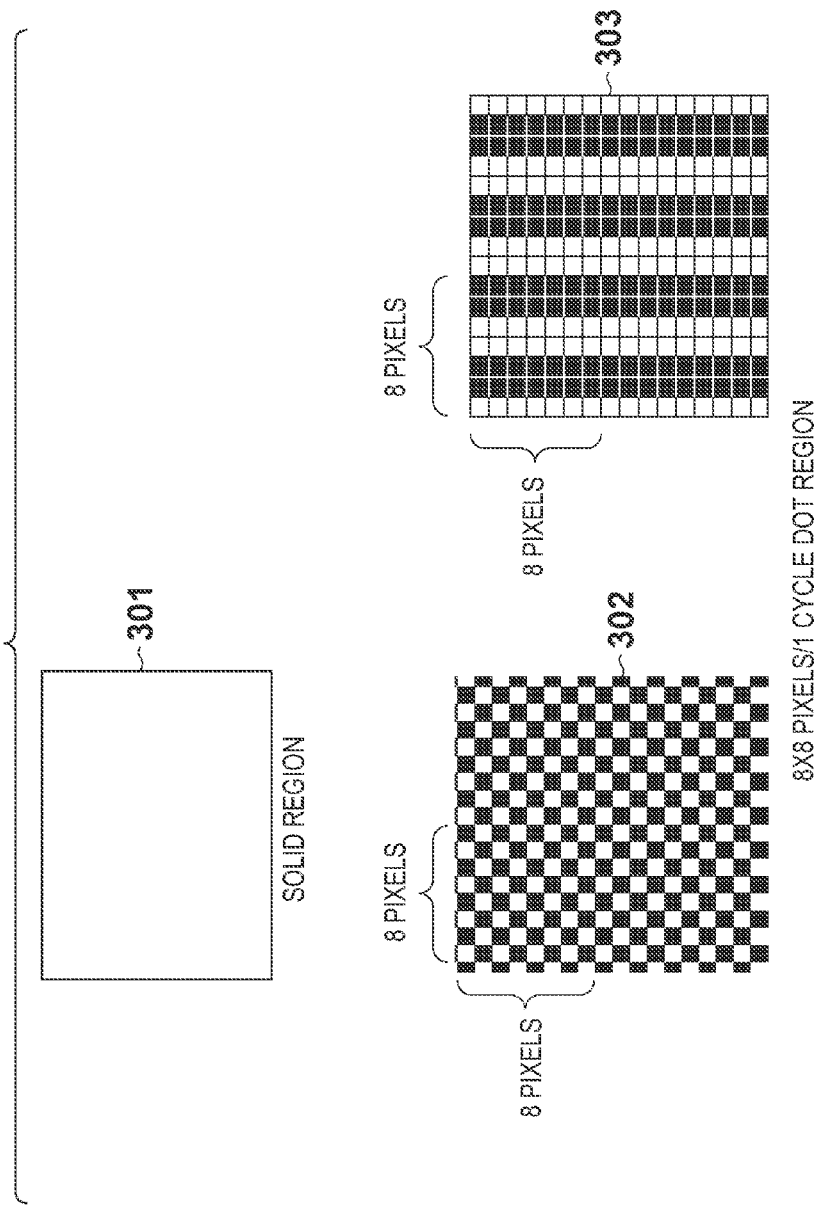
FIGS. 3A to 3C are explanatory diagrams of redundancy which occurs in JPEG encoded data.
Figures 3B, 3C:
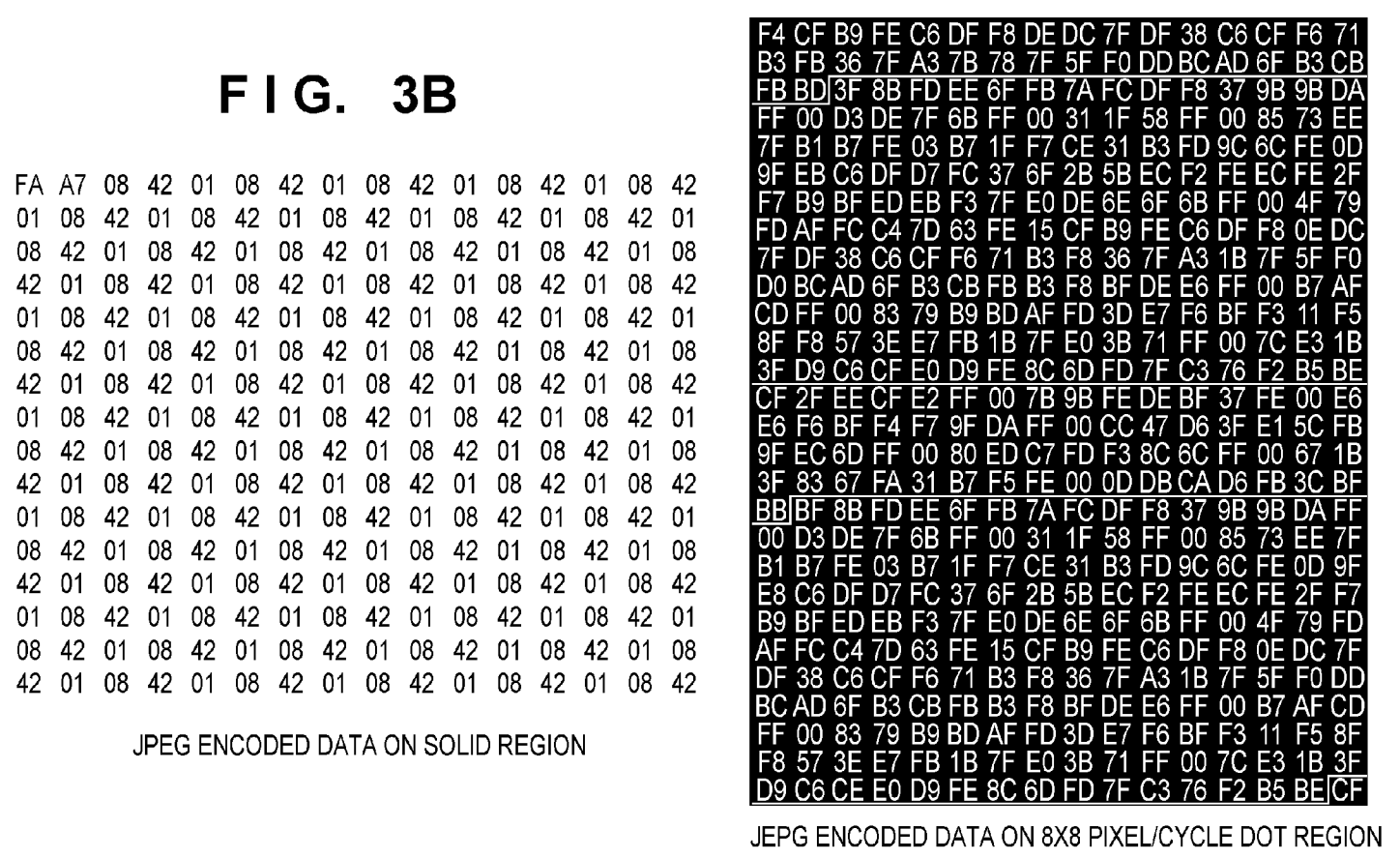

According to the JPEG coding method (ISO/IEC IS 10918-1), as described in its recommendations, an input image is divided into 8×8 pixel sized blocks, and coding is performed approximately independently by each block. When an image 301 as shown in FIG. 3A having a flat luminance (or density) region or images 302 and 303 having 8×8 pixels/1 cycle dot region are inputted, the same code stream is generated from each block. As a result, redundancy due to repetition of the same code stream occurs in the encoded image data. FIGS. 3B and 3C show encoded image data of the corresponding regions when the image 301 having the flat region and the image 302 (or 303) having the dot region in FIG. 3A have been inputted. On the other hand, in the JPEG 2000 method, when the cycle of 8×8 pixel block as a unit exists in an image, redundancy due to cyclicity can be efficiently eliminated by coding on predetermined conditions. Accordingly, the occurrence of redundancy can be suppressed in comparison with the JPEG method. The conditions and grounds for the suppression of redundancy will be described based on the outline of the algorithm of the JPEG 2000 method.

Figure 4:
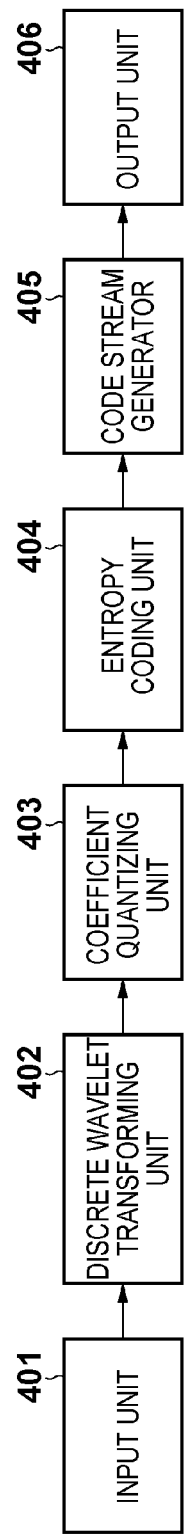
FIG. 4 is a block diagram of a JPEG 2000 coding apparatus.
Figure 5:
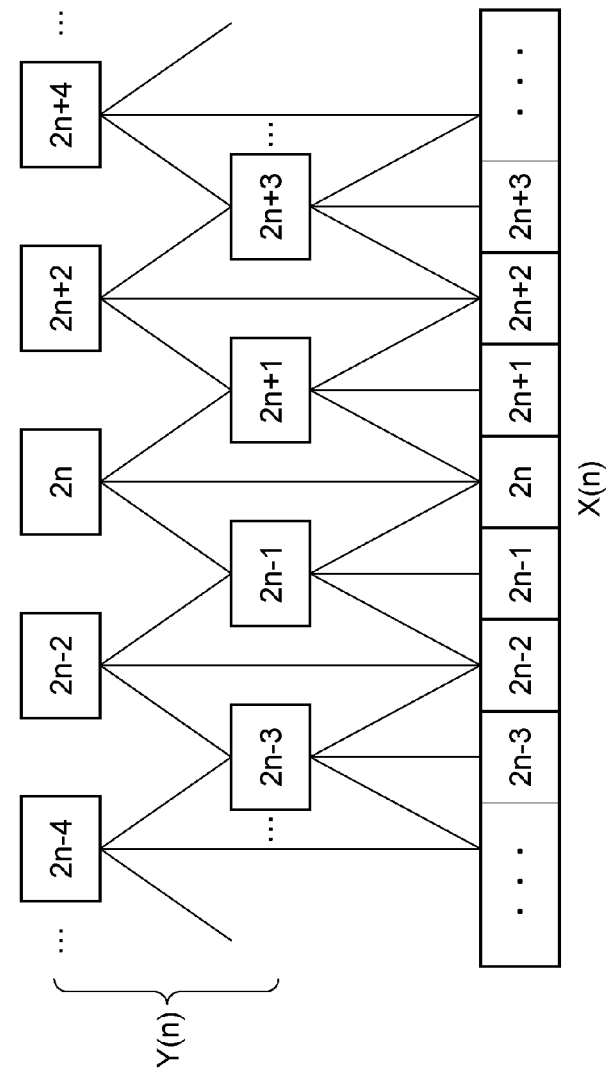
FIG. 5 is an explanatory diagram of Discrete Wavelet transformation.

FIG. 4 is a block diagram of a general JPEG 2000 coding apparatus. In FIG. 4, reference numeral 401 denotes an input unit; 402, a Discrete Wavelet transforming unit; 403, a quantizing unit; 404, an entropy coding unit; 405, a code stream generator; and 406, an output unit. Image data is supplied from the input unit 401 to the Discrete Wavelet transforming unit 402. As shown in FIG. 5, the Discrete Wavelet transforming unit 402 performs Discrete Wavelet transformation using plural pixels. Note that a frame data after the Discrete Wavelet transformation (Discrete Wavelet transformation coefficients) are calculated in accordance with the following expression.

$$Y(2n) = X(2n) + \text{floor}\{(Y(2n-1) + Y(2n+1) + 2)/4\}$$

$$Y(2n+1) = X(2n+1) - \text{floor}\{(X(2n) + X(2n+2))/2\} \quad (1)$$

Note that Y(2n) and Y(2n+1) are Discrete Wavelet transformation coefficient sequences. The sequence Y(2n) is a low frequency sub band, and the sequence Y(2n+1), a high frequency sub band. Further, in the above transformation expression (1), "floor{X}" means a maximum integer value not exceeding X. FIG. 5 schematically shows this Discrete Wavelet transformation.

Figure 6A:
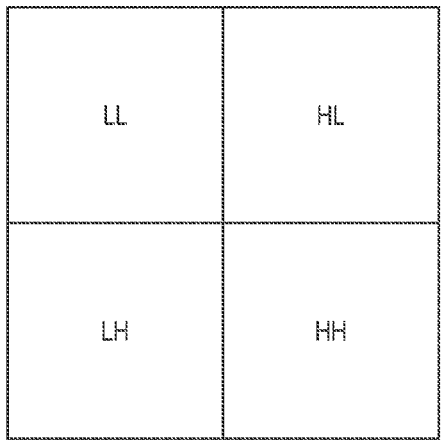
FIGS. 6A to 6C are explanatory diagrams of the Discrete Wavelet transformation.
Figure 6B:
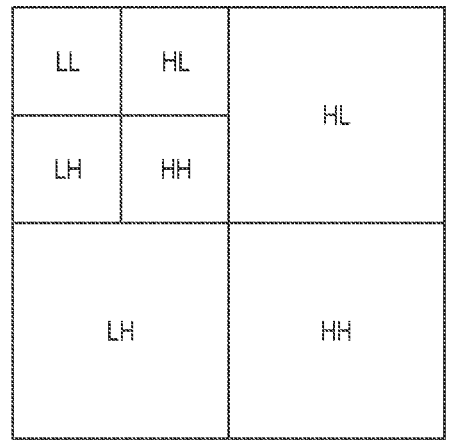
Figure 6C:
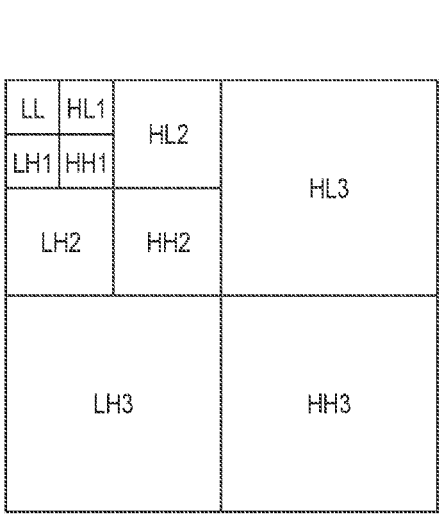

The above-described transformation expression (1) is used with respect to one-dimensional data. Further, when this transformation is applied in horizontal direction then vertical direction to perform two-dimensional transformation, four sub bands, LL, HL, LH and HH as shown in FIG. 6A are obtained. Note that "L" indicates a low frequency sub band, and "H", a high frequency sub band. Next, the Wavelet transformation is performed on the LL sub band and four sub bands are generated (FIG. 6B), and further, four sub bands are obtained from the LL sub bands among the generated sub bands (FIG. 6C). In this manner, total ten sub bands are generated. The ten sub bands are referred to as HH1, HL1, . . . , as shown in FIG. 6C. Note that the names of the respective sub bands indicate the levels of the respective sub bands. That is, the sub bands HL1, HH1 and LH1 are level 1 sub bands. Further, the sub bands HL2, HH2 and LH2 are level 2 sub bands. The sub bands HL3, HH3 and LH3 are level 3 sub bands. Note that the LL sub band is a level 0 sub band. Further, since there is only one LL sub band, generally it has no suffix. Further, decoded image obtained by decoding the level 0 to level n sub bands is referred to as an "level n decoded image". The resolution of the decoded image is higher in accordance with its level. The transformation coefficients of the ten sub bands are temporarily stored in a buffer 304, and the sub bands LL, HL1, LH1, HH1, HL2, LH2, HH2, HL3, LH3 and HH3, in this order, i.e., from the low level sub band to the high level sub band, are outputted to the coefficient quantizing unit 403. Note that in the above-described example, the number of divisions (the number of applications of the Wavelet transformation) is "3", however, the number is not limited to this number.

The coefficient quantizing unit 403 quantizes the transformation coefficients of the respective sub bands at a quantizing step determined by each frequency component, and outputs the quantized values (quantized coefficient values) to the entropy coding unit 404. As the subject matter of the present invention does not include the details of the quantizing method, the explanation of the details will be omitted. The quantized coefficients (quantized coefficient values) are outputted to the entropy coding unit 404.

Figure 7:
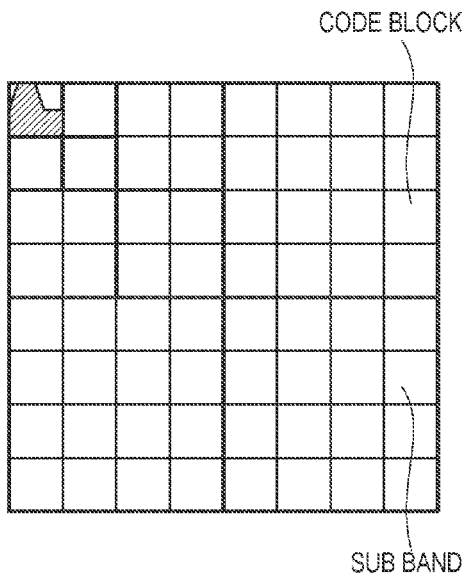
FIG. 7 is an explanatory diagram of code block division.

The entropy coding unit 404 entropy-encodes the input quantized coefficient values. In this example, first, as shown in FIG. 7, the respective sub bands as sets of the input quantized coefficient values are divided in rectangular blocks (code blocks). In the present embodiment, the size of the code block is 16×16. Next, the coefficients in the code block are divided into bit planes, and binary arithmetic coding is performed sequentially from a higher-order bit plane toward a lower-order bit plane, to generate entropy-encoded data. The JPEG 2000 coding algorithm is as described above.

Next, the above-described elimination of redundancy in an image having an 8×8 pixel block (JPEG coding unit) cycle will be described.

FIG. 5 and the expression (1) are used for explanation of the Discrete Wavelet transformation. As a characteristic feature of the Discrete Wavelet transformation, when transformation is performed once in a one-dimensional direction, the numbers of coefficients of the low frequency components and high frequency components become the half of the number of pixels of the input image. When the transformation is performed twice, the numbers of coefficients of the low frequency components and high frequency components become ¼ of the number of pixels of the input image. When the transformation is performed thrice, the numbers of coefficients of the low frequency components and high frequency components become ⅛ of the number of pixels of the input image. That is, it is considered that when the Discrete Wavelet transformation is performed thrice, one coefficient is generated with respect to low frequency and high frequency components by 8 pixels of the input image. Further, since a decompressed image has an 8-pixel cycle, one coefficient is generated at each cycle. Further, as the respective coefficients are generated from the same cycle, the coefficients have the same value. That is, when the Discrete Wavelet transformation is performed thrice, the same value continues in the respective low frequency component and high frequency component sub bands, and a flat region appears in the sub bands. It is possible to perform very high efficient compression on the flat region by the binary arithmetic coding. The ground for redundancy elimination from the 8-pixel/1 cycle image in the JPEG 2000 coding is as described above.

Figure 8:
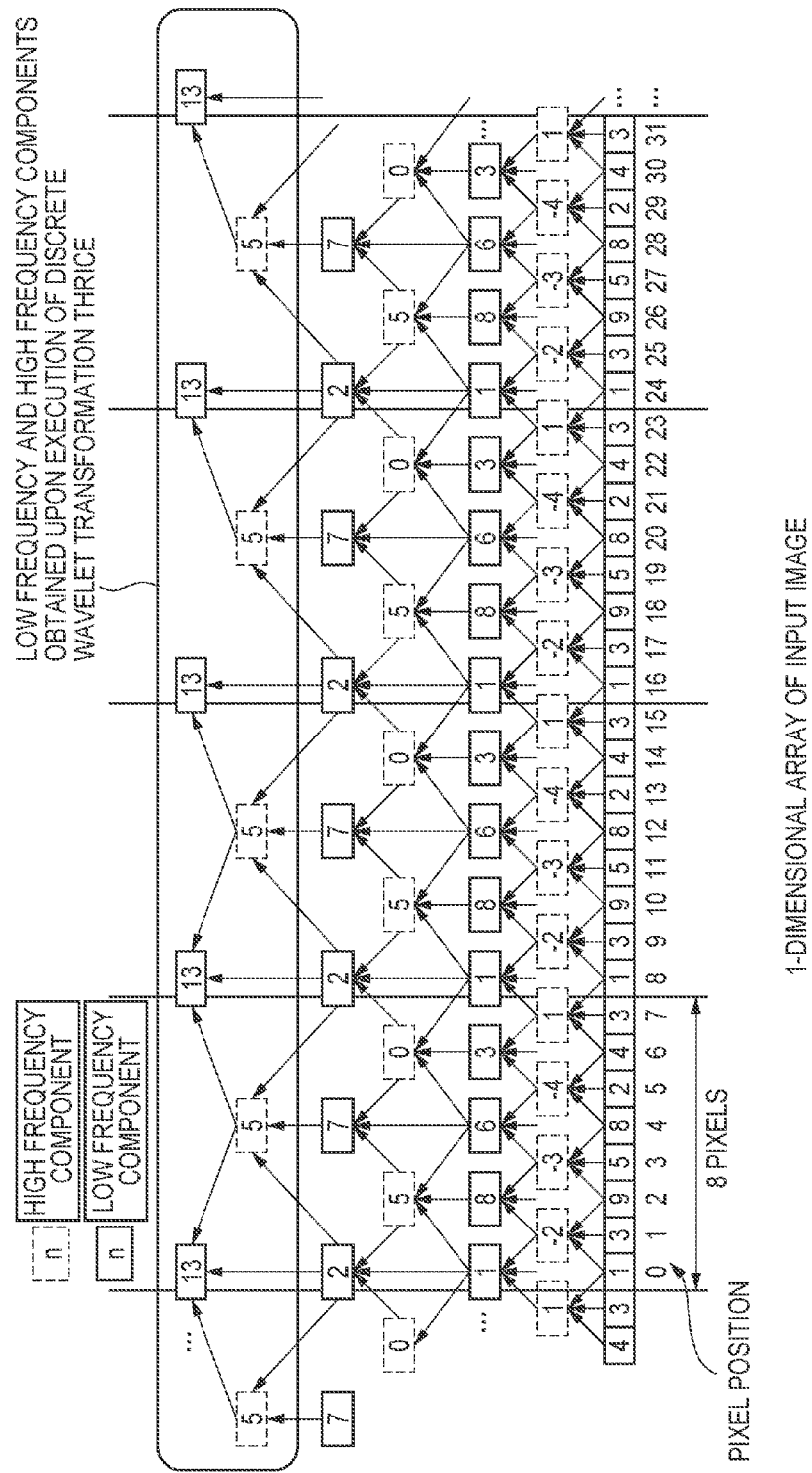
FIG. 8 is an explanatory diagram of the Discrete Wavelet transformation.

Further, as described above, in the present embodiment, the binary arithmetic coding is performed by 16×16 sized code block. From the expression (1) and FIG. 8, the relation between the number of Discrete Wavelet transformations (n) and the number of pixels required for generation of high frequency and low frequency components obtained with the n-th transformation is as shown in FIG. 9. In FIG. 9, the numbers of pixels required for generation of 16 components in the low frequency and high frequency components obtained with the third Discrete Wavelet transformation are 149 pixels and 141 pixels. That is, the binary arithmetic coding performed with the 16×16 sized code block as a unit is approximately equivalent to coding in 141×141 pixel units with respect to high frequency components and coding in 149×149 pixel units with respect to low frequency components. In the JPEG coding, redundancy can be eliminated in a wider region in comparison with coding in 8×8 pixel units.

As described above, when an input image has an 8×8 pixel cycle, it is possible to efficiently eliminate redundancy by the JPEG 2000 coding in comparison with the JPEG coding. There are two grounds. One of the two grounds is that in the JPG 2000 coding, the 8×8 pixel cycle image is represented as a flat region. Then the region is compressed by the efficient entropy coding. The second ground is that the coding is performed with a wider region as a unit in comparison with the JPEG coding.

Next, the concept of the dictionary-based coding algorithm will be described. Further, the adequacy of application of the dictionary-based coding to JPEG encoded data and setting of generated code amount as a target code amount upon re-encoding will be described.

In digital data meaningful to some degree such as an image, an audio message, a document and the like, data values are not disorderly arrayed but alignment of very similar pattern often appears. That is, when data value alignment (data pattern) is found then a code shorter than the data value alignment is applied to the data value alignment and outputted, the information can be represented with a smaller data amount in comparison with that of an original. The data pattern and information to manage code values corresponding to the data pattern are generally referred to as a "dictionary". The dictionary-based coding is performing coding while structuring a dictionary and referring to the dictionary. Hereinbelow, the outline of processing as an example of the dictionary-based coding algorithm will be described.

Figure 10:
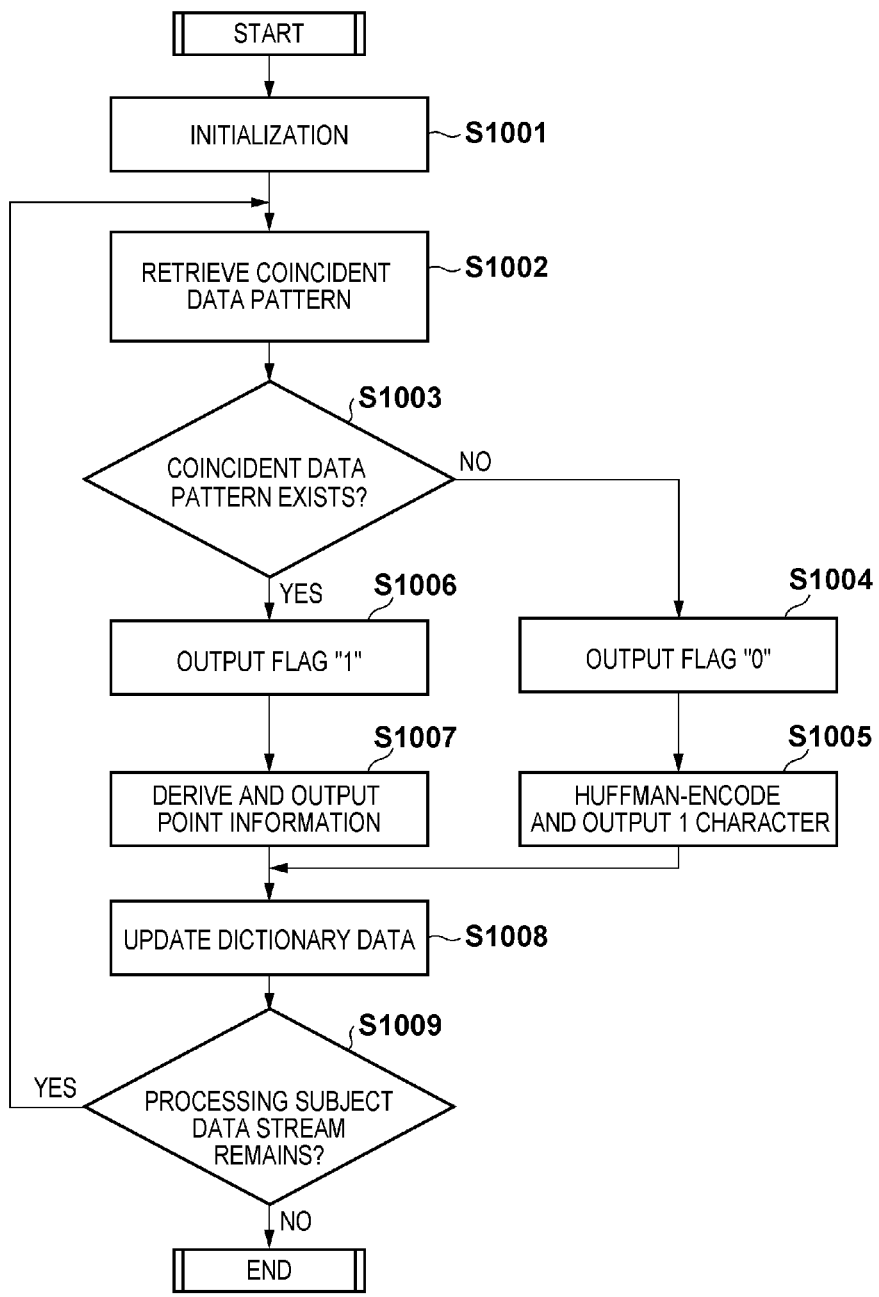
FIG. 10 is a flowchart showing dictionary-based coding.
Figure 11A:
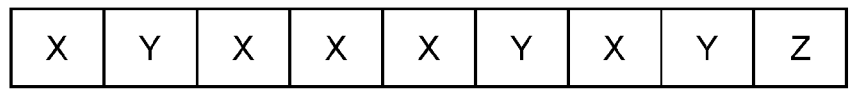
FIGS. 11A and 11B are examples of a processing subject data stream in the dictionary-based coding and a dictionary memory.
Figure 11B:
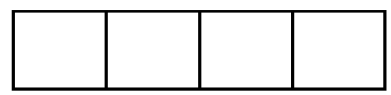
Figure 12:
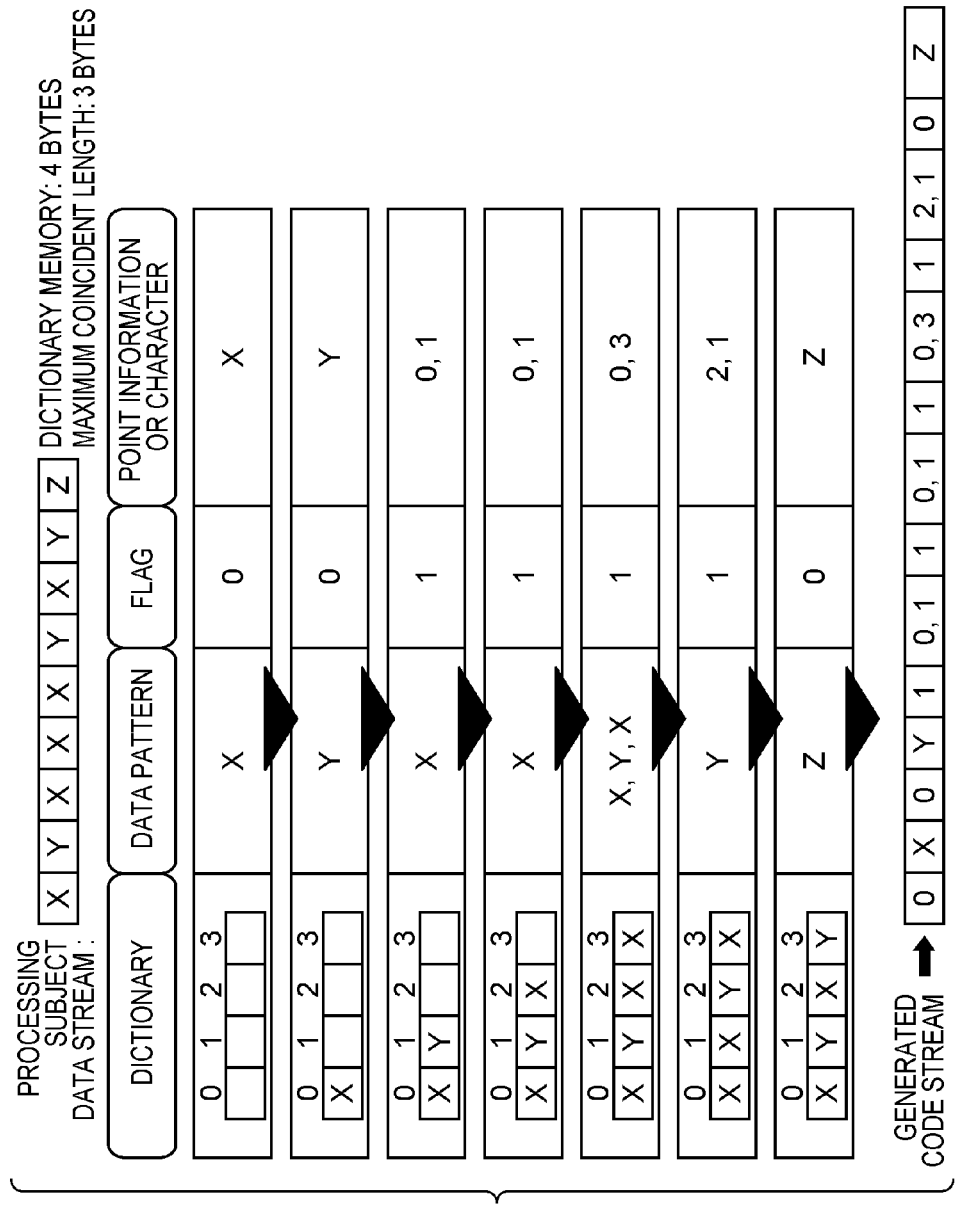
FIG. 12 is an explanatory diagram showing the flow of the dictionary-based coding processing.

The flowchart of FIG. 10 shows the processing procedure of dictionary-based coding application executed by a processor in an information processing apparatus. Further, FIG. 11A shows an example of data as a coding subject, and FIG. 11B, an example of a dictionary memory. In FIG. 10, when the coding processing is started, the processor performs initialization (step S1001). The initialization means input of processing subject data, allocation of the dictionary memory in a memory, and setting of a maximum coincident length. In this description, the processing subject data is as shown in FIG. 11A, and the dictionary memory has, as shown in FIG. 11B, a 4 byte capacity. Note that the 4 byte capacity is set for the sake of convenience of explanation, and it can be arbitrarily changed in accordance with embodiment. The maximum coincident length is a maximum value of same data pattern length (coincident length) allowed in the coding processing. In the present dictionary-based coding, the maximum coincident length is required since a coincident length is represented with a fixed length. Next, a coincident data pattern is retrieved from the dictionary memory (step S1002). At this time, when the coincident length is an upper limit value, the retrieval is stopped at that time. Further, when there are plural coincident data patterns, all of them are obtained. When there is no coincident data pattern (No at step S1003), "0" is outputted as information (flag) indicating presence/absence of coincident pattern (step S1004). Then one character is Huffman-encoded and outputted (step S1005). Then the process proceeds to step S1008. On the other hand, when a coincident data pattern has been found (Yes at step S1003), "1" is outputted as the flag (step S1006). Then, among the retrieved data patterns, the location and length of a data pattern having the maximum coincident length in the dictionary (point information) is obtained and outputted (step S1007). Next, the processed data stream is added to the end of the dictionary (step S1008). When the data length after the addition of the processed data stream exceeds the data length of the dictionary, its head part is eliminated such that the data is stored in the dictionary memory. Then, it is determined whether or not data to be processed remains (step S1009). When no data remains (No at step S1009), the process ends. On the other hand, data to be processed remains (Yes at step S1009), the process returns to step S1002. FIG. 12 shows an example using particular data.

As described above, the dictionary-based coding eliminates redundancy due to data pattern repetition. Accordingly, it can be understood that when the method is applied to JPEG encoded data, redundancy in JPEG encoded data due to redundancy in an image as shown in FIGS. 3B and 3C can be eliminated. However, to use the code amount obtained by applying the dictionary-based coding to JPEG encoded data as a target code amount upon recompression, it is necessary to take the following one problem into consideration. In the JPEG 2000 coding, redundancy in an image is eliminated within a predetermined range, however, in the dictionary-based coding, spatial redundancy equal to or wider than the range is eliminated. More particularly, in the above description of the JPEG 2000 coding, redundancy can be eliminated in 149 pixel units regarding the low frequency components. However, in the dictionary-based coding, redundancy equal to or more than 149 pixels, when exists, is eliminated. That is, when recompression is performed with a code amount obtained by the dictionary-based coding as a target, essential information which influences the image quality other than the redundancy is eliminated by quantization. This problem is solved by encoding the range in which the redundancy can be eliminated by the JPEG 2000 coding and resetting the dictionary memory after the coding. However, in the JPEG coding, since each 8×8 pixel block is variable-length encoded, it is impossible to obtain the number of 8×8 pixel blocks included at one cycle of repetition in the JPEG encoded data. As an example, a case where one 8×8 pixel block exists at one cycle and a case where eight 8×8 pixel blocks exist at one cycle are given. Accordingly, it is impossible to derive the number of cycles corresponding to 149 pixels. Since it is necessary to avoid unnecessary elimination of redundancy, in the embodiments, it is assumed that the number of 8×8 pixel blocks included in one cycle is four. That is, the number of pixels included in one cycle is thirty-two, the maximum number of cycles not exceeding 149 pixels is four. When four same cycles continuing in the process of the dictionary-based coding are detected, the dictionary memory is reset.

Note that in JPEG encoded data, encoded 8×8 pixel block data are arrayed in the raster scan order, and the dictionary-based coding is sequentially performed from the head of the JPEG encoded data toward the end of the data. Accordingly, redundancy cannot be eliminated in two dimensional directions. The amount of redundancy which can be eliminated is smaller than that in the JPEG 2000 coding. However, the difference of the number of dimensions in the range of redundancy deletion is not a serious problem to attain the purpose of the present invention, to obtain a "rough standard" of the target code amount upon re-encoding.

First Embodiment

Hereinbelow, the embodiments of the present invention will be described in detail based on the above description.

Figure 1:
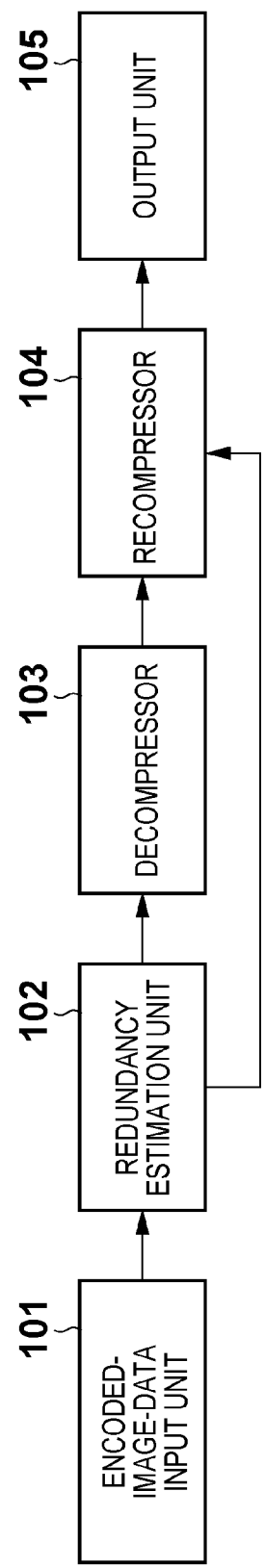
FIG. 1 is a block diagram of an image processing unit in a first embodiment of the present invention.

FIG. 1 is a block diagram of an image processing apparatus in a first embodiment of the present invention. In FIG. 1, numeral 101 denotes an encoded-image-data input unit; 102, a redundancy estimation unit which functions as a target code amount calculation unit; 103, a decompressor; 104, a recompressor; and 105, an output unit. In FIG. 1, the encoded-image-data input unit 101 inputs JPEG encoded data, and outputs the input JPEG encoded data to the redundancy estimation unit 102. In the redundancy estimation unit 102, the maximum number of redundancy-deletable pixels is 149 pixels as described above. Further, the number of blocks included in one cycle of repetition of code stream in JPEG encoded data is four. That is, when repetition of floor (149/(8*4))=4 has been detected, as it is not necessary to perform redundancy measurement, the dictionary memory is reset.

Figure 14A:
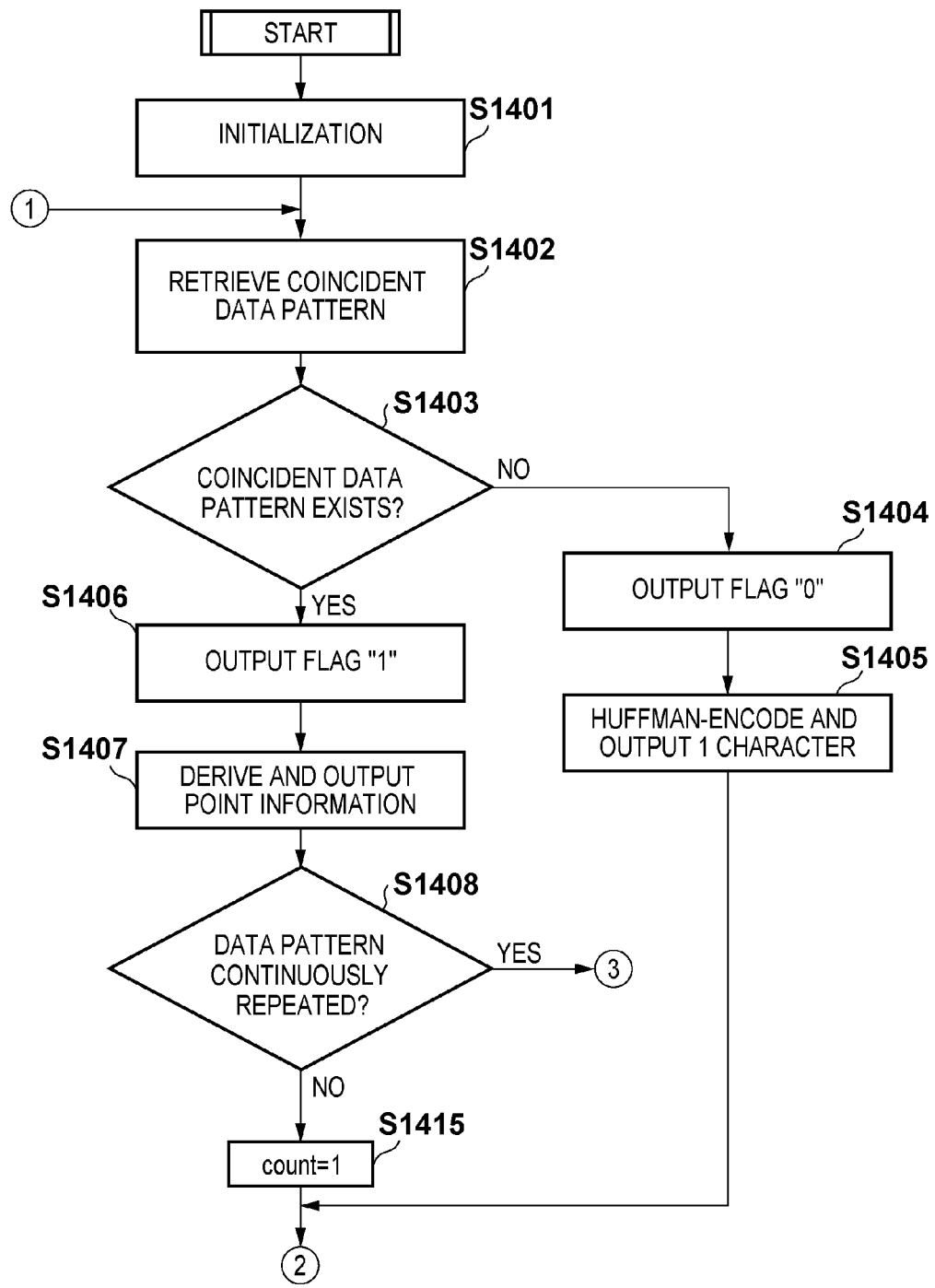
FIGS. 14A and 14B are flowcharts showing the dictionary-based coding in the first embodiment.
Figure 14B:
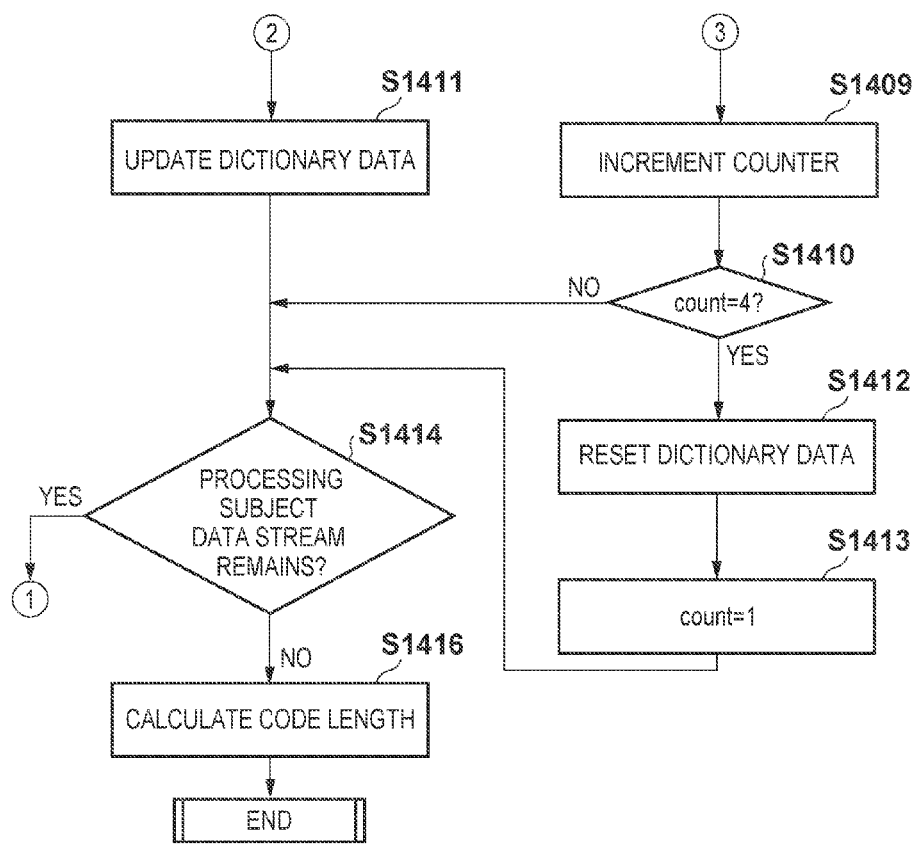

FIGS. 14A and 14B are flowcharts showing the processing by the redundancy estimation unit 102. The present processing flow is based on the above-described flowchart of FIG. 10. Further, FIG. 2 is a block diagram of the redundancy estimation unit 102.

Figure 2:
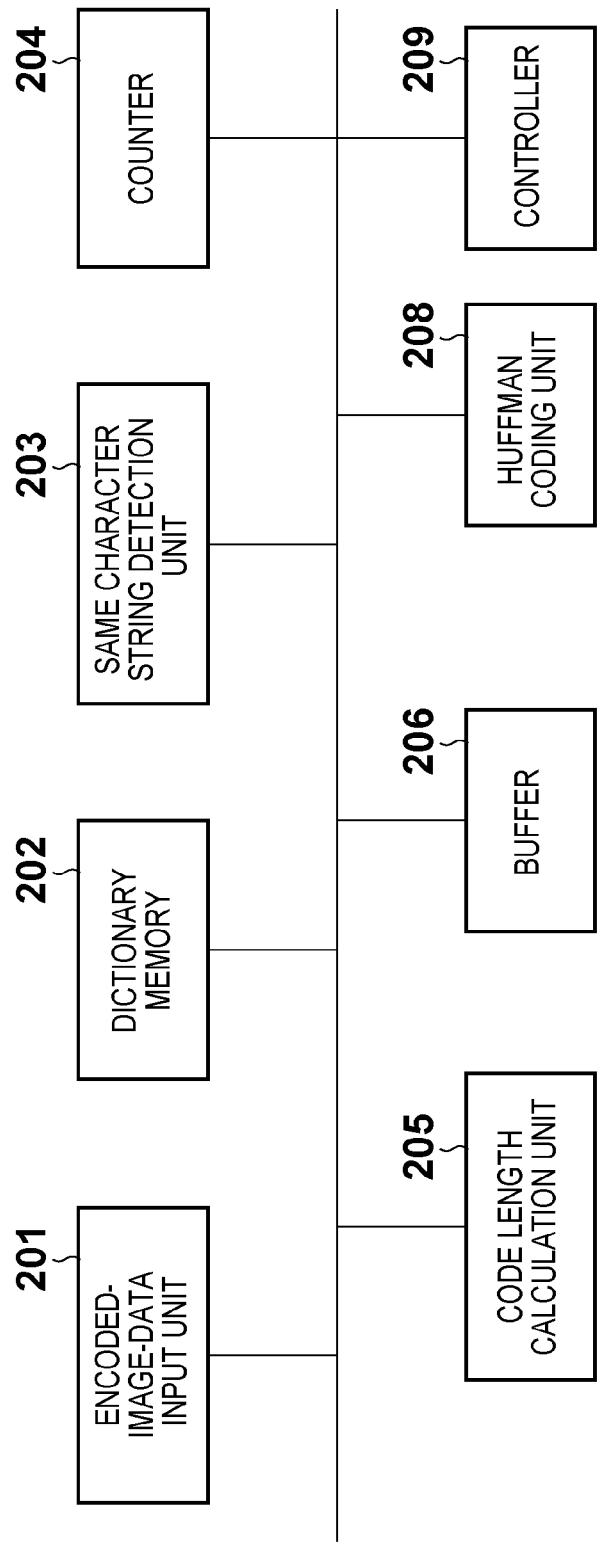
FIG. 2 is a block diagram of a redundancy estimation unit 102 in the first embodiment.

In FIGS. 2, 14A and 14B, when JPEG encoded data is inputted into an encoded-image-data input unit 201, a controller 209 performs initialization (step S1401). The initialization means input of processing subject data, allocation of the dictionary memory, setting of the maximum coincident length, and further, initialization of a counter 204 to count data pattern repetition. As the initialization of the counter 204, "1" is set (count=1). In the present embodiment, as the dictionary memory, 1024 bytes, and as the maximum coincident length, two hundred fifty-six are set. Next, in a same character string detection unit 203, a coincident data pattern is retrieved from the dictionary memory (step S1402). At this time, when the coincident length is an upper limit value (256), the retrieval is stopped at that time. Further, when there are plural coincident data patterns, all of them are obtained. When there is no coincident data pattern (No at step S1403), "0" is outputted as information (flag) indicating presence/absence of coincident pattern (step S1404). Then one character is Huffman-encoded by the Huffman-coding unit 208 and outputted (step S1405). Then the process proceeds to step S1411. Note that the output destination is a buffer 206. Hereinafter, all the generated codes are outputted to the buffer 206. On the other hand, when a coincident data pattern has been found (Yes at step S1403), "1" is outputted as the flag (step S1406). Then, among the retrieved data patterns, the location and length of a data pattern having the maximum coincident length in the dictionary (point information) is obtained and outputted (step S1407). Then, it is determined whether or not the data pattern of which the point information has been outputted is continuously repeated (step S1408). When the data pattern is not repeated (No at step S1408), the value of the counter 204 is reset to "1" (step S1415). Next, the processed data stream is added to the end of the dictionary memory 202 (step S1411). Then, the process proceeds to step S1414. On the other hand, when it is determined at step S1408 that the data pattern is repeated, the counter value is incremented at step S1409. FIGS. 15A and 15B show a particular example of the case of repetition. Next, it is determined whether or not the counter value is equal to "4" (step S1410). When it is determined that the counter value is not equal to "4" (No at step S1410), the process proceeds to step S1414. When it is determined that the counter value is equal to "4" (Yes at step S1410), it is determined that it is impossible to eliminate more repetition redundancy in the subsequent JPEG 2000 recompression. Then the dictionary data is reset so as not to eliminate the redundancy of the cycle of interest (step S1412). Particularly, the pointer indicating an adding position in the dictionary data is returned to the head. Further, the counter is reset (step S1413), and the process proceeds to step S1414. At step S1414, it is determined whether or not data to be processed remains. When data to be processed remains (Yes at step S1414), the process returns to step S1402. When no data remains (No at step S1414), a code length calculation unit 205 calculates a code length of the dictionary-based encoded data stored in the buffer (step S1416), and outputs the calculated code length to the recompressor 104. Then the process ends.

The redundancy estimation unit 102 performs the dictionary-based coding processing on the JPEG encoded data, and outputs the code length to the recompressor 104. Then the JPEG encoded data is outputted to a decompressor 103. The decompressor 103 performs decompression processing (decoding processing) on the JPEG encoded data. As the details of the processing are well known, the explanation of the processing will be omitted. The decompressed image obtained by the decompression processing is outputted to the recompressor 104. The recompressor 104 sets a target code amount based on the code length of the dictionary-based coding inputted from the code length calculation unit 205, and compresses the image by the JPEG 2000 coding. Note that assuming that the code length of the dictionary-based coding inputted from the code length calculation unit 205 is $L_D$ and the target code amount, $L_T$, in accordance with a predetermined function F( ), $L_T=F(L_D)$ is calculated. The most simple calculation is $L_T=\alpha \times L_D$. In this calculation, $\alpha=1$ holds. Further, it may be arranged such that, considering that redundancy in two-dimensional directions is not eliminated in the dictionary-based coding, and with the assumption of the code length upon elimination of redundancy in two-dimensional directions, $\alpha$ is set to a value less than "1" such as "0.9" (i.e., the target code amount $L_T$ is set to a value less than the code amount $L_D$ by the dictionary-based coding). Since the outline of the JPEG 2000 coding method has been described, the explanation of the outline of the method will be omitted. Note that to realize the target code amount, it may be arranged such that lower bits of binary arithmetic-encoded coefficients are rounded down preferentially. That is, assuming that the code amount obtained from the encoding by the recompressor 104 is L, and the predetermined allowable threshold value, Th, the encoded data from the least significant bit plane toward the higher-order bit plane are eliminated until $|L_D - L| \leq Th$ is satisfied.

The first embodiment is as described above. As a modification, it may be arranged such that the accuracy of estimation with respect to redundancy elimination upon recompression is lowered so as to mitigate the dictionary-based coding processing. More particularly, the spatial range to eliminate redundancy upon recompression is presumed, and the work of resetting the dictionary data is omitted. For example, the method as shown in FIG. 10 used upon explanation of the concept of the dictionary-based coding may be used. The merit of this approach is that in addition to the mitigation of the processing, since the processing can be realized with existing dictionary-based software used in ZIP or LZH compression/decompression, work load of installation of new software can be reduced. Further, when such software is already installed in an image processing apparatus which implements the approach of the present invention, the work of installation of the software can be omitted. Note that in this case, the dictionary-based coding method is applied while viewing a wide image range. Accordingly, the redundancy is eliminated more than that in the coding method used in recompression. It may be arranged such that in view of this point, the target code amount is set to a greater value than the code amount in the dictionary-based coding method. For example, the above-described α may be greater than "1".

Further, as another modification, it may be arranged such that the dictionary-based coding is not applied to the header of JPEG encoded data since the redundancy of header information in JPEG encoded data does not relate to the redundancy in a decompressed image.

Further, in the above-described embodiment, image data as a subject of re-encoding is JPEG encoded data, and the recompressor 104 performs encoding processing based on the JPEG 2000 method. As described above, it is possible to perform coding with higher compressibility than that of the JPEG method while suppressing degradation of image quality since a pixel group can be encoded in a wider range than 8×8 pixels as an encoding unit in the JPEG method. Accordingly, JPEG XR may be adopted in place of the JPEG 2000 method. The JPEG XR encoding is also applicable in the following other embodiments.

Second Embodiment

In the above-described first embodiment, redundancy is estimated using the dictionary-based coding. In the second embodiment, without the dictionary-based coding, the cycle of repetition of code stream in encoded image data is detected, and the length and the number of repetitions of the cycle is obtained. Then based on the information, the redundancy of a recompression subject image is estimated. The outline of particular processing will be described with reference to FIGS. 19A and 19B. In those figures, a table is previously stored, and a cycle number of the first field means a serial number allotted to a continuous cycle when detected. The code amount at one cycle in the second field is one cycle code amount regarding the detected continuous cycle. When there is a continuous cycle of a bit pattern (byte pattern) as shown in FIG. 13A, the code amount at one cycle is 1 (byte), and that in the case of FIG. 13B is 5 (bytes). The number of repetitions in the third field is the number of repetitions of the continuous cycle of interest, and its value is equal to or greater than 2. In the fourth field, the redundant code amount, which can be eliminated, is the result of multiplication between a value obtained by subtracting "1" from the number of repetitions and the one cycle code amount. In this method without encoding, the processing time can be reduced in comparison with the first embodiment.

Figure 17:
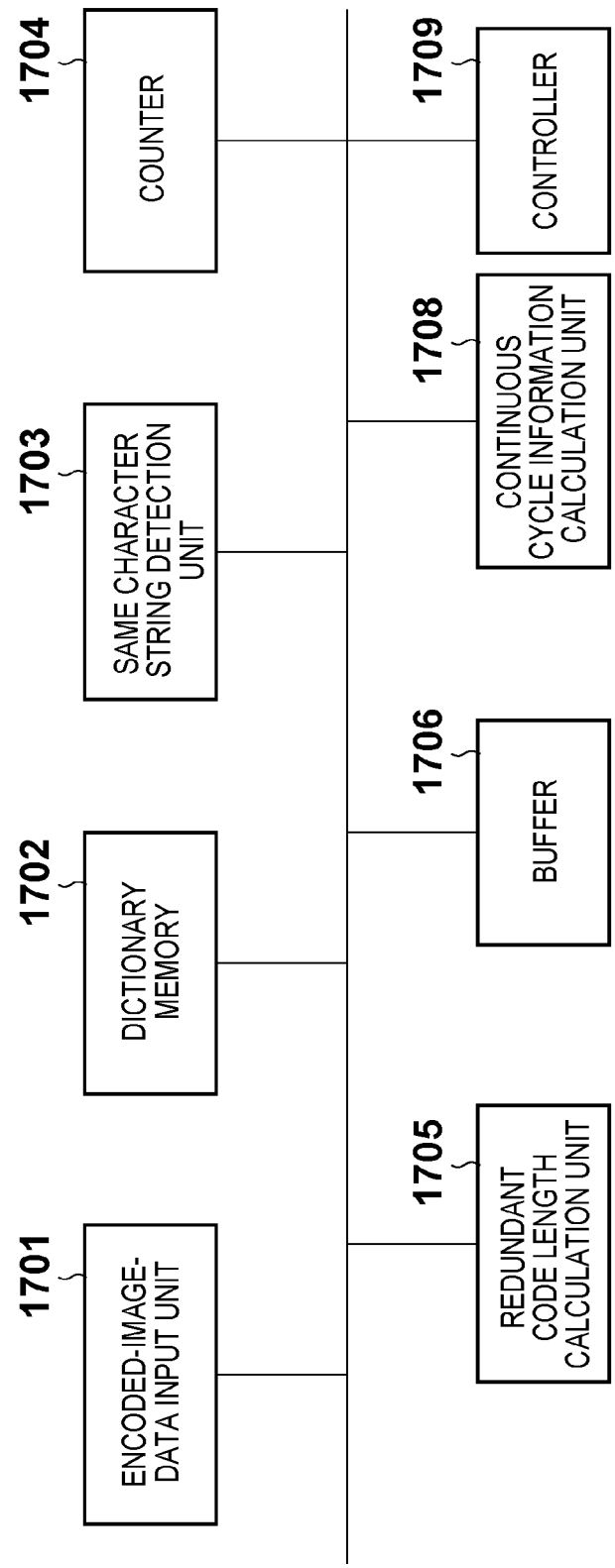
FIG. 17 is a block diagram of a redundancy estimation unit 1601 in the second embodiment.
Figure 18:
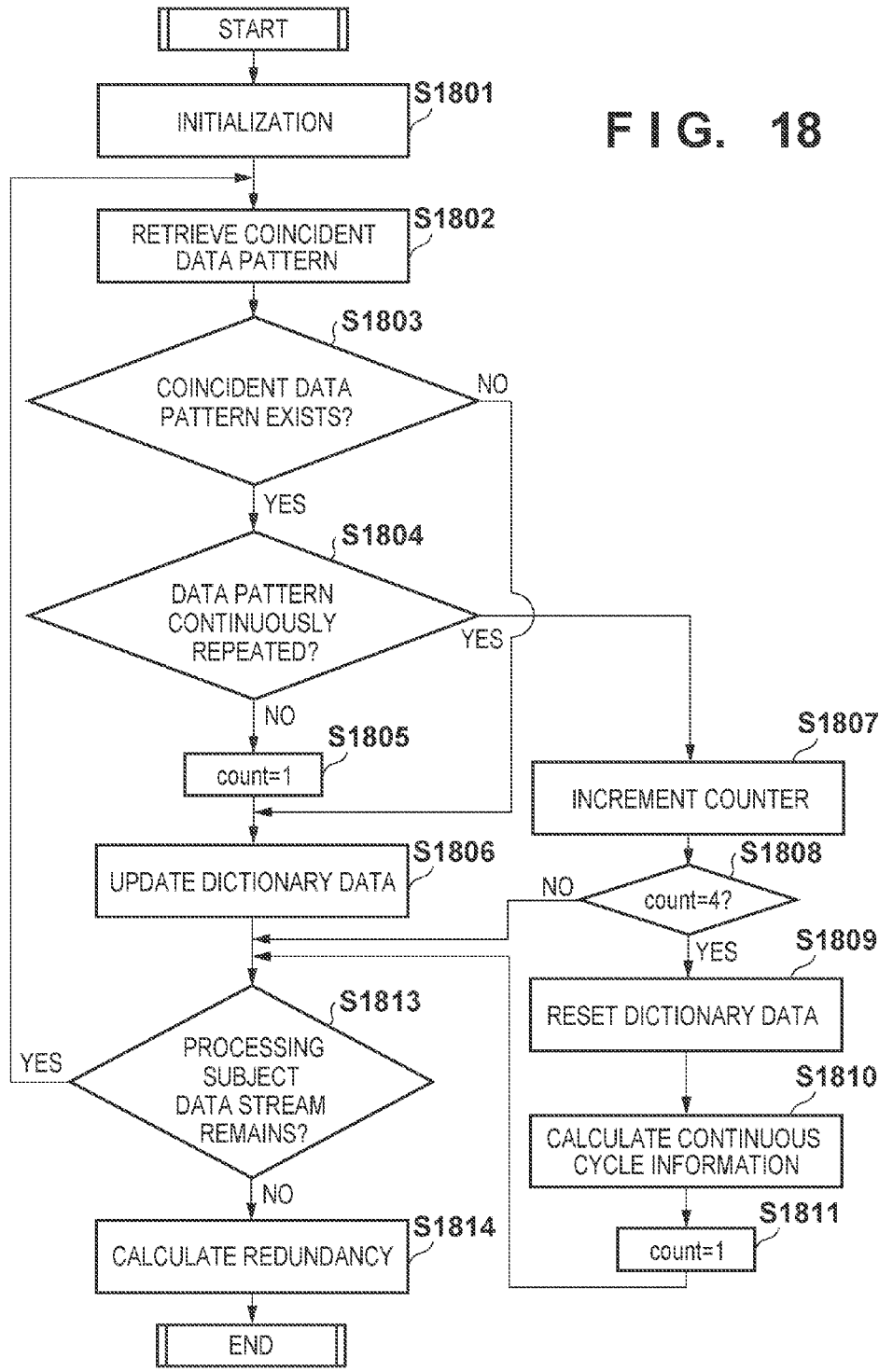
FIG. 18 is a flowchart showing the processing by the redundancy estimation unit 1601 in the second embodiment.

FIG. 16 is a block diagram of the second embodiment. The difference of this figure is that the redundancy estimation unit 102 in the block diagram of the first embodiment in FIG. 1 is replaced with a redundancy estimation unit 1601. Accordingly, the redundancy estimation unit 1601 will be mainly described below. FIG. 17 is a block diagram of the redundancy estimation unit 1601. FIG. 18 is a flowchart showing the processing content of the redundancy estimation unit 1601. When JPEG encoded data is inputted into an encoded image data input unit 1701, a controller 1709 performs, using the buffer 1706, initialization (step S1801), and controls a same character string detection unit 1703, to retrieve a coincident data pattern (step S1802), and determines the presence/absence of coincident data pattern (step S1803). The processing to this step S1803 is the same as that at steps S1001 to S1003 in the flowchart of FIG. 10 in the first embodiment. When there is no coincident data pattern (No at step S1803), the process proceeds to step S1806. On the other hand, when a coincident data pattern has been found (Yes at step S1803), it is determined whether or not the coincident data pattern continuously exists (step S1804). When the coincident data is not repeated (No at step S1804), the value of a counter 1704 is reset to "1" (step S1805). Next, the processed data stream is added to the end of a dictionary memory 1702 (step S1806). Then, the process proceeds to step S1813. On the other hand, when it is determined at step S1804 that the coincident data is repeated, the counter value is incremented (step S1807). At that time, when plural cycles exist in the data pattern, the counter value is incremented by the number of cycles. The incrementation is the same as that in the first embodiment. Next, it is determined whether or not the value of the counter 4 is equal to "4" (step S1808). When the counter value is not equal to "4" (No at step S1808), the process proceeds to step S1806. In the subsequent recompression by the JPEG 2000 coding, there is a high probability that the redundancy of four or more repetitions cannot be deleted. Accordingly, when the counter value is equal to "4" (Yes at step S1808), the dictionary data is reset so as not to delete the redundancy of the cycle of interest (step S1809). Next, as shown in FIG. 19A, regarding the cycle of interest, a continuous cycle information calculation unit 1708 calculates the redundant code amount (step S1810). Note that the result of calculation is recorded in the internal memory of the continuous cycle information calculation unit 1708. Then the counter is reset (step S1811), and the process proceeds to step S1813. At step S1813, it is determined whether or not unprocessed data remains in the JPEG encoded data. When unprocessed data remains (Yes at step S1813), the process returns to step S1802. When no unprocessed data remains (No at step S1813), a redundant code length calculation unit 1705 calculates estimated redundancy (redundant data amount) from the result of calculation stored in the internal memory of the continuous cycle information calculation unit 1708 (step S1814). More particularly, a table showing the result of calculation as shown in FIG. 19B is generated, and from the result, the redundancy or a target code amount is calculated. When the calculation is completed, a value, obtained by subtracting the result of calculation from the original encoded data amount, is outputted as a target code amount to the recompressor 104. Then the process ends.

Other Embodiments

Figure 20A:
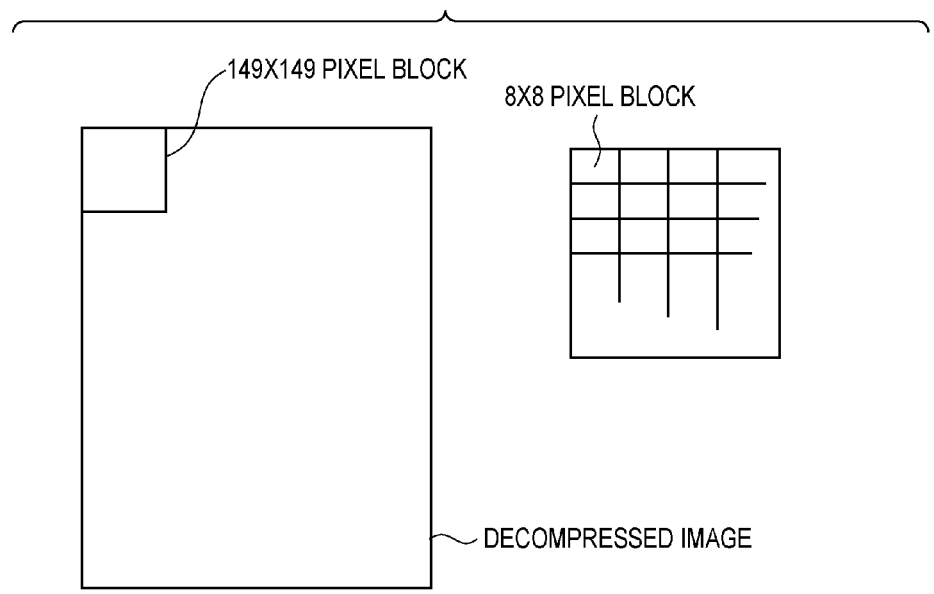
Figure 20B:
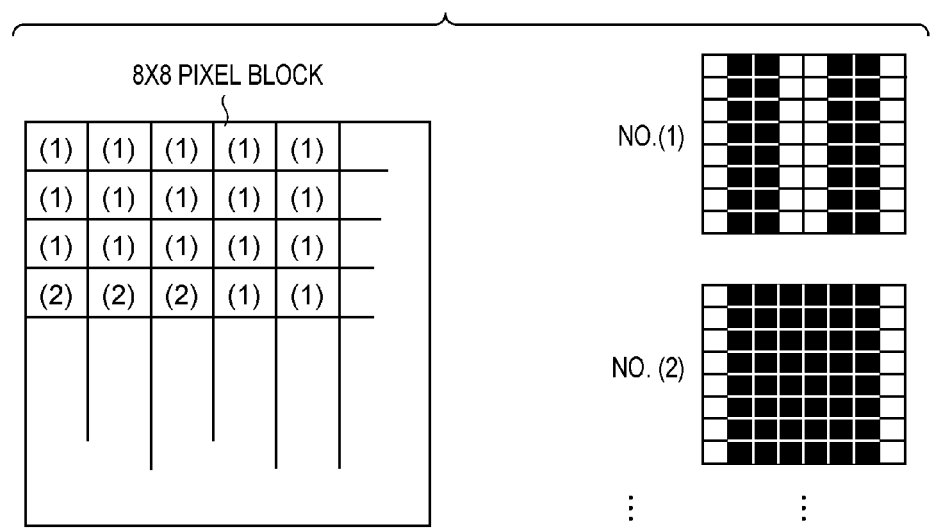

In the first and second embodiments, the redundancy only in one-dimensional direction of an image is handled. However, an image is represented as two-dimensional data, and it is expected that a target code amount is estimated with higher accuracy by using a method of two-dimensional image redundancy estimation. The present invention includes such method for two-dimensional redundancy estimation in its scope. As an example, it may be arranged such that encoded image data is decompressed and redundancy is measured from the decompressed image. More particularly, as in the case of the first embodiment, encoded image data as a subject of recompression is indicative of a JPEG image, and the recompression method is the JPEG 2000 method. Further, the range of redundancy for deletion of code block as an encoding unit in the JPEG 2000 coding is 149×149 pixels. When JPEG data to be recompressed is determined, it is decompressed, and as shown in FIG. 20A, the decompressed image is divided into 149×149 pixel regions (redundancy elimination unit regions). Note that since 8×8 pixel block code amount will be used in the subsequent processing, it is written into the memory in the image processing apparatus in the progress of decoding. Then, as shown in FIG. 20B, by redundancy elimination unit region, the pattern of each 8×8 pixel block is analyzed, and the pixel blocks are classified by allotting the same number to the identical patterns. Next, as shown in FIG. 20C, in adjacent vertically and laterally diagonal 8×8 pixel blocks having the same number are grouped, and a group number is allotted to the group. Note that as the ground for the vertically and laterally diagonal grouping, as described above, in the JPEG 2000 method, in sub bands generated upon thrice Discrete Wavelet transformation, the number of coefficients obtained from each 8×8 pixel block is one. In this grouping, it is possible to efficiently delete redundancy of continuous 8×8 pixel blocks in the sub bands and refer to the vertically and laterally diagonal direction in encoding of each coefficient. Regarding each group, JPEG code amounts obtained from one respective 8×8 pixel block and the number of 8×8 pixel blocks in the group are obtained, and an apparent redundant code amount (single-group redundancy code amount) is calculated. Then, the total sum of respective single group redundancy code amounts is obtained, as a redundancy of the redundancy elimination unit region of interest. Further, the sum of redundancies in all the redundancy elimination unit regions in the decompressed image, as redundancy of the decompressed image, is subtracted from the JPEG encoded data amount. The obtained code amount is used as a target code amount upon recompression.

In the first and second embodiments, the first coding algorithm with a pixel block having a predetermined number of pixels as a unit is the JPEG coding. Further, the second coding algorithm to perform coding with a block greater than the pixel block as a unit is the JPEG 2000 coding. Then, as the third coding algorithm to determine redundancy in encoded data, the dictionary-based coding is used. However, this combination of the coding algorithms is not limited. For example, as the second coding algorithm, any method may be included in the scope of the present invention as long as recompression is performed by a coding method capable of deletion of image redundancy in comparison with the coding method for encoded image data as a subject of recompression. For example, the ISO standard, JPEG XR may be used. Although the detailed explanation of JPEG XR will be omitted, an input image is divided into 16×16 pixel macro blocks and encoding is performed by block. That is, the redundancy of the image is deleted with the range of 16×16 pixels. Accordingly, upon recompression of JPEG XR encoded data, the object can be attained by setting the code block size in the JPEG 2000 coding to a greater size than 16×16 size. This is included in the scope of the present invention. Further, re-encoding of JPEG data by JPEG XR is also included in the scope of the present invention.

In the present invention, the method for recompressing encoded image data has been described, however, an image processing system using the recompression method is also included in the scope of the present invention. For example, when a user has XPS (XML Paper Specification) data and upon direct-print to an MFP or the like, when the MFP is compliant to only PDF (Portable Document Format) format, conversion of the data to the PDF format is required. Since XPS is JPEG XR-compliant but PDF is not JPEG XR-compliant, upon format conversion, PDF-capable image recompression processing occurs. As PDF is JPG 2000-compliant, the JPEG 2000 method can be used as the recompression processing, and the method disclosed in the present invention is applicable. This embodiment is also included in the scope of the present invention.

Further, in the above-described respective embodiments, redundancy determination using the dictionary-based coding has been shown, however, the present invention is not limited to the redundancy determination using the dictionary-based coding. Other coding techniques than the dictionary-based coding may be used as redundancy of encoded data as a subject of re-encoding can be determined.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-040838, filed Feb. 25, 2011, which is hereby incorporated by reference herein in its entirety.

What is claimed is:

1. An image processing apparatus which re-encodes encoded data, encoded in accordance with a first coding algorithm, with a pixel block having a predetermined number of pixels as a unit, comprising:

an input unit to input encoded data encoded in accordance with the first coding algorithm as a re-encoding subject;

a second encoder, based on a second coding algorithm, to perform coding of an image with a block in a larger size than said pixel block in the first coding algorithm as a unit;

a redundancy estimation unit to estimate a redundancy of coded data coded in accordance with the first encoding algorithm by performing lossless coding of the coded data without decoding the coded data in accordance with a third coding algorithm different from the first and second coding algorithms;

a target code amount calculation unit to cause said redundancy estimation unit to estimate the redundancy of the encoded data inputted by said input unit and to calculate, from the estimated redundancy of the encoded data inputted by said input unit, a target code amount with respect to said second encoder; and a controller to decode the encoded data inputted by said input unit to obtain a decoded image and to cause said second encoder to encode the decoded image to generate encoded data in said target code amount calculated by said target code amount calculation unit, wherein at least one of the second encoder, the redundancy estimate unit, the target code amount calculation unit, and the controller, is included in a computer processor.

2. The image processing apparatus according to claim 1, wherein said first coding algorithm is JPEG coding algorithm, and said second coding algorithm is JPEG 2000 or JPEG XR coding algorithm.

3. The image processing apparatus according to claim 2, wherein, assuming that said target code amount is $L_D$, the code amount by said second encoder, L, and a previously-set threshold value, Th, said controller deletes the encoded data in bit planes in an order from a least significant bit plane toward a higher-order bit plane until $|L_D-L| \leq Th$ is satisfied.

4. A control method for an image processing apparatus which re-encodes encoded data, encoded in accordance with a first coding algorithm, with a pixel block having a predetermined number of pixels as a unit, said method comprising:

an input step of inputting encoded data encoded in accordance with the first coding algorithm as a re-encoding subject by an input unit;

a second coding step based on a second coding algorithm of encoding an image with a block in a larger size than said pixel block in the first coding algorithm as a unit, by a second encoder;

a redundancy estimation step to estimate a redundancy of coded data coded in accordance with the first encoding algorithm by performing lossless coding of the coded data without decoding the coded data in accordance with a third coding algorithm different from the first and second coding algorithms;

a target code amount calculation step to cause said redundancy estimation step to estimate the redundancy of the encoded data inputted in said input step and to calculate, from the estimated redundancy of the encoded data inputted by said input step, a target code amount with respect to said second coding step; and a control step of decoding the encoded data inputted at said input step to obtain a decoded image and to and cause said second coding step to encode the decoded image to generate encoded data in said target code amount calculated in said target code amount calculation step.

5. A non-transitory computer-readable storage medium holding a program, read and executed by a computer, to cause said computer to perform the method in claim 4.

6. The apparatus according to claim 1, wherein the third coding algorithm is a dictionary-based coding algorithm.

7. The method according to claim 4, wherein the third coding algorithm is a dictionary-based coding algorithm.

* * * * *